United States Patent [19]

Kiselev

[11] Patent Number: 4,820,456
[45] Date of Patent: Apr. 11, 1989

[54] MASS-TRANSFER APPARATUS

[75] Inventor: Viktor M. Kiselev, Kharkov, U.S.S.R.

[73] Assignee: Ukrainsky Nauchno-Issledovatelsky Institut Prirodnykh Gazov "Ukrniigaz", Kharkov, U.S.S.R.

[21] Appl. No.: 171,001

[22] PCT Filed: May 29, 1986

[86] PCT No.: PCT/SU86/00050
 § 371 Date: Jan. 22, 1988
 § 102(e) Date: Jan. 22, 1988

[87] PCT Pub. No.: WO87/07174
 PCT Pub. Date: Dec. 3, 1987

[51] Int. Cl.[4] .............................................. B01F 3/04
[52] U.S. Cl. .................................... 261/111; 261/113; 55/87; 55/178
[58] Field of Search ................... 261/113, 111; 55/87, 55/178

[56] References Cited

U.S. PATENT DOCUMENTS 2,875,993  3/1959  Marcy ................................. 261/113
2,926,754  3/1960  Ragatz ................................. 55/87
4,263,021  4/1981  Downs et al. ....................... 261/113

FOREIGN PATENT DOCUMENTS 58-37002   8/1983  Japan.
303978     7/1971  U.S.S.R..
434969    11/1974  U.S.S.R..
578091    10/1977  U.S.S.R..
590002     2/1978  U.S.S.R..
691164    10/1979  U.S.S.R..
965483    10/1982  U.S.S.R..

OTHER PUBLICATIONS

Pozin, M. E., "Pennye Gazoochistitel: Teploobmenniki i Absorbery", Leningrad, 1959, p. 51.

Primary Examiner—Tim Miles
Attorney, Agent, or Firm—Burgess, Ryan and Wayne

[57] ABSTRACT

The mass-transfer apparatus comprises a case (1), accommodating at least one horizontal perforated tray (6) and a froth retainer (7). The froth retainer (7) is mounted directly on the tray (6) and is made in the form of a grid composed of vertical bars (8). The vertical bars (8) make up cells (9), interconnected with each other. Lower portions of the bars (8) of the froth retainer (7), contiguous with the tray (6), are made solid, whereas the cells (9) of the grid communicate with one another through perforations made in the upper portions of the bars (8) of the froth retainer (7).

7 Claims, 2 Drawing Sheets

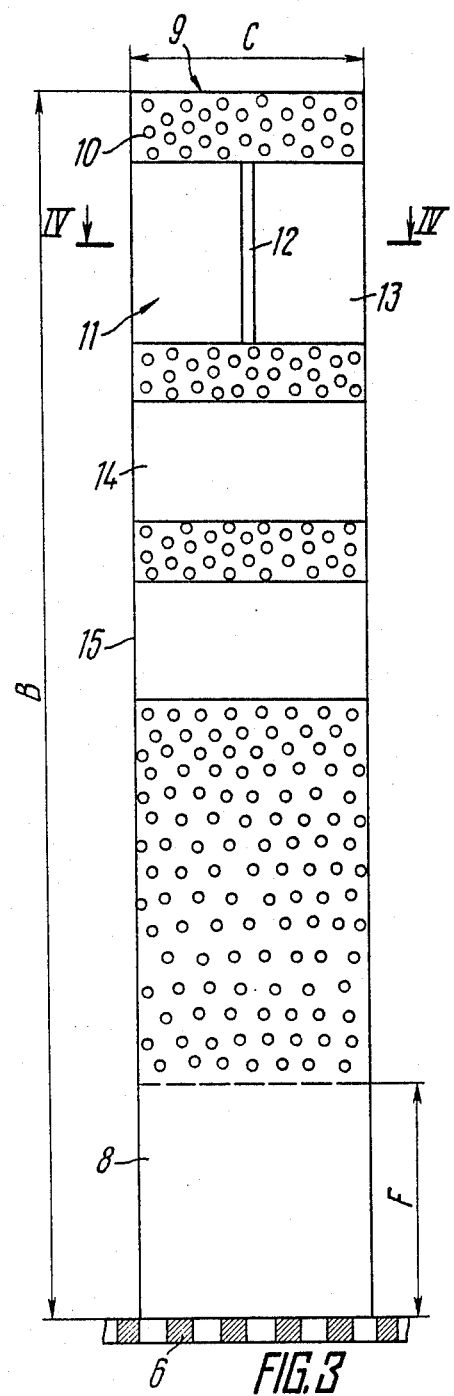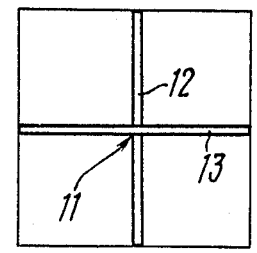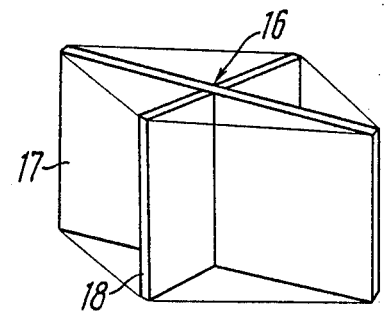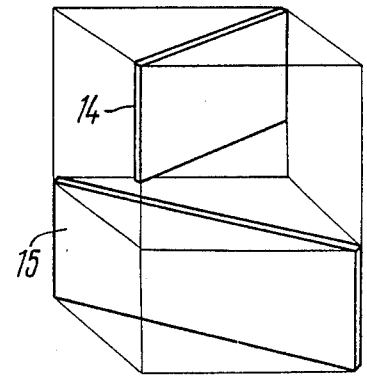

MASS-TRANSFER APPARATUS

FIELD OF THE ART

The invention relates to chemical and petroleum engineering and has specific reference to mass-transfer apparatus.

PRIOR ART

Known in the art is a mass-transfer apparatus for gas-to-liquid contact in the case whereof there are contained one perforated tray, or several such trays, and a sprayer (cf. Pozin M.E. "Pennye gazoochistiteli, teploobmenniki i absorbery", Leningrad, 1959, p. 51).

A liquid fed from the sprayer forms a layer of mobile froth on the tray to absorb certain gases or dust from the bulk gas flow.

The capacity of the known apparatus is low, for the flow rate of the gas through the net cross-sectional area thereof is slow, commonly not over 2 or 2.3 m/s, and the layer of froth on the tray is thin (around 100 mm).

Any attempt to boost the capacity gives rise to turbulence which leaves some portions of the tray uncovered with the froth, permitting some of the gas to pass through the tray unprocessed. This reduces the effectiveness of the apparatus.

Also known is a mass-transfer apparatus which, in addition to heat and mass transfer, can cope also with wet scrubbing of gases (cf. USSR Inventor's Certificate No. 434.969, Int. Cl.B01 d 47/04). The case of the known apparatus contains perforated trays each whereof is fitted with a contiguous froth retainer in the form of a grid made up of upright bars. The height of every bar is 0.2 to 0.6 times the thickness of the froth layer, and the net cross-sectional area of a grid is at least 0.8 time the net cross-sectional area of the apparatus. Perforations are provided in some of the bars of the froth retainer, next to the surface of the tray.

The main purpose the froth retainer is to set up on the tray a thick and homogenous layer of froth with fine cellular structure and to provide for a continuous flow of the phases at their interface without apparent fluctuations. In other words, the froth retainer eliminate turbulence and, consequently, increase the capacity of the apparatus.

However, the effectiveness of the process of heat and mass transfer taking place in the known apparatus at the gas flow rates over 2.6 to 3.0 m/s is low for the air-water system under the atmospheric conditions). Intermittent eddies brought at the top of the froth layer expel some of the liquid from grid cells along the axes thereof, rendering this portion ineffective as a medium for an active mass transfer or dust recovery. An accompanying splashing impairs the capacity of the apparatus and the effectiveness of mass transfer process.

The perforations in the lower portions of some bars of the froth retainer cannot provide for a uniform distribution of the liquid flow over the entire surface of the tray.

DISCLOSURE OF THE INVENTION

The main object of the invention is to provide in a mass-transfer apparatus a froth retainer designed so as to increase both the capacity and the effectiveness of the apparatus, uniformly distribute the liquid in the form of a froth with fine cellular structure over the entire surface of a tray and prevent splashing of the liquid along the axes of grid cells should the gas flow rate be speeded up.

The essence of the invention consists in that in a mass-transfer apparatus in the case whereof there are contained at least one horizontal perforated tray and a froth retainer in the form of a grid made up of upright bars which are fitted directly to the tray and form interconnected cells, according to the invention, the lower portions of the bars of the froth retainer are made solid and the cells of the grid communicate with one another by way of perforations in the upper portions of the bars of the froth retainer.

Such an arrangement ensures self-instituted distribution of the liquid on the tray thanks to overflow of froth from one cell to another through perforations of the bars of the froth retainer. The solid portions of the froth retainer bars serve to prevent undesired overflow of the liquids along the tray to depressions or obliquities of the tray, thereby ensuring uniform distribution of the liquid across the tray of relatively large surface area.

It is expedient that the solid lower portions of the bars of the froth retainer be of a height which is 0.1 to 0.5 of the overall height of these bars. This prevents undesirable accumulation of the liquid at depressions and obliquities of the tray surface and is conductive to a uniform distribution of the layer over the entire surface of the tray.

It is also expedient that the ratio of the total net area of the perforations in the froth retainer and that of the perforations in the tray be 1.2–3.0.

This ratio provides for a dependable self-instituted control of the froth layer when the liquid overflows from one cell to another.

It is further expedient that the height of the froth retainer is 0.6–1.0 time the distance between two trays, provided the apparatus has more than one tray.

The froth retainer standing as high as that provides for an effective operation of the mass-transfer apparatus over a wide range of gas flow rates.

In small-diameter apparatus, the froth retainer can extend over the entire distance separating two adjacent trays. In large-diameter apparatus, it is practical that the height of the froth retainer is somewhat smaller than the distance between the trays. An unobstructed space so formed permits a redistribution of the gas (vapour) flow to take place before the gas reaches the above-lying tray.

It is preferred that at least two diagonal baffle plates located crosswise one above the other are provided in every cell of the froth retainer, the height of every baffle plate equalling at least one half of the length of a cell side.

The liquid striking against a baffle plate spreads thereover and is deflected towards cell walls so that no axialwise splashing cruciform baffle plate which enhances the splash-depressing effect. A steady froth stability is the outcome even in large cells.

It is also preferred that at least one cruciform baffle plate is provided in every cell, with the height of this baffle plate equalling at least one half of the length of a cell side.

The cruciform baffle plate suppresses the splashing better than a diagonal one does, providing for an increase in the capacity of the mass-transfer apparatus. Thsi is achievable by increasing either the size of cells or the gas (vapour) flow rate, without changing the size of cells in this latter case.

It is further preferred that the baffle plates in the cells are perforated.

The perforated baffle plates have a better showing than solid ones in suppressing the splashing and keeping up the froth in the cells. Their performance permits the flow rate of gas or vapour to be increased in the apparatus.

BRIEF DESCRIPTION OF DRAWINGS

A preferred embodiment of the invention will now be described by way of example with reference to the accompanying drawings in which

FIG. 3 is a sectional elevation of a cell of a froth retainer showing a cruciform baffle plate at the top and two diagonal baffle plates below it;

FIG. 4 is a section on line IV—IV of FIG. 3;

FIG. 5 is an axonometric view of a diagonally-arranged cruciform baffle plate in a cell;

FIG. 6 is an axonometric view of two diagonal baffle plates located a distance apart.

BEST MODE OF EFFECTING THE INVENTION

Figures 1, 2:
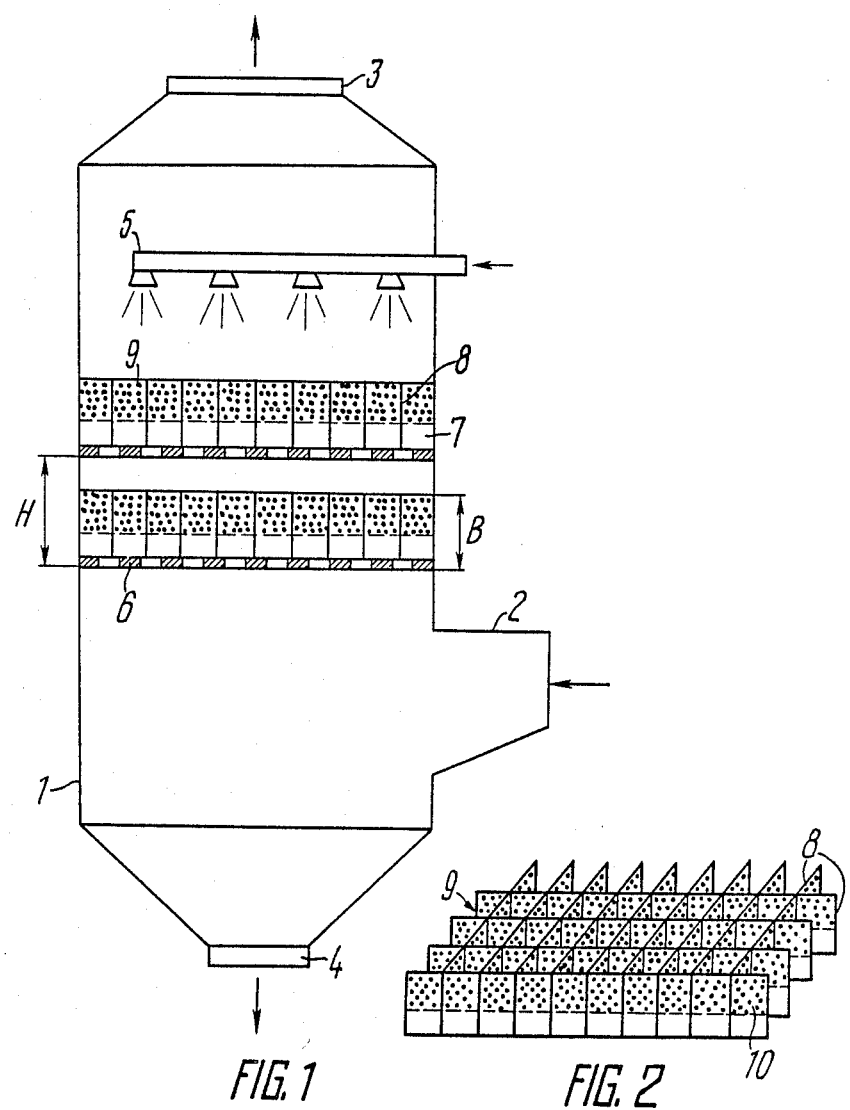
FIG. 1 is a sectional elevation of the apparatus according to the invention.
FIG. 2 is an axonometric view of a froth retainer.

Referring to FIG. 1, a case 1 of the mass-transfer apparatus of a rectangular or circular section is fitted with gas inlet and outlet pipes 2, 3 and a union 4 through which spent liquid leaves the apparatus. A sparayer 5 is located in the case 1 above a horizontal perforated tray 6 formed and kept up whereon is a layer of froth. The perforated tray 6 is made up either of perforated sheets or separate tubes (rods) which form a regular grid. A froth retainer 7 made up of upright bars constituting a grid with cells 9 is fitted directly to the tray 6.

A length C of a side of the square cell 9 is 0.08–0.25 time a height B of the cell side.

The mass-transfer apparatus of FIG. 1 is fitted with two trays but, according to the invention, there can be only one tray or more than two trays. In an apparatus with two or more trays, the height B of the froth retainer 7 is 0.6–1.0 of the distance H between two adjacent trays 6.

Referring to FIG. 2 which is an axonometric view of a froth retainer 7, the cells 9 thereof communicate with one another via perforations 10 provided at the top of the bars 8, whereas the lower portions of the bars 8 (FIG. 3) are made solid. A height F of the solid portion of every bar 8 is 0.1–0.5 of the height B of the bar 8.

The way of perforations 10 are arranged in the bars 8 of the froth retainer 7 is shown in detail in FIG. 3 which is a sectional elevation of the cell 9. The number and diameter of the perforations 10 are selected so that the ratio of the total net area of the perforations 10 in the froth retainer 7 and that of the perforations in the tray is 1.2–3.0.

A cruciform baffle plate 11 formed by bars 12, 13 which run parallel with the bars 8 of the froth retainer 7 is fitted at the top of the cell 9. The baffle plates (12, 13) may be perforated.

Diagonal baffle plates 14, 15 are fitted below the cruciform baffle plate 11 and a distance apart from each other.

FIG. 4 illustrates a version of the cruciform baffle plate 11 the bars 12, 13 whereof are secured parallel with the bars 8 (FIG. 1) of the froth retainer 7.

FIG. 5 illustrates diagonal baffle plates 14, 15 which are located in the cell 9 (shown in light lines) of the froth retainer 7 out of contact with one another. However, diagonal baffle plates located in contact with one another provide a possible alternative.

FIG. 6 illustrates a version of a cruciform baffle plate 6 with diagonal bars 17, 18 located inside a cell 9 (FIG. 1) of the froth retainer 7 shown in light lines.

Cruciform baffle plates located parallel with the bars of the froth retainer (FIG. 4) and those coinciding with the diagonals of the cell (FIG. 5) are of equal value as far as their performance is concerned. The option depends on the process of manufacturing the froth retainers.

The baffle plates shown in FIGS. 3 through 6 are made of solid bars but perforated baffle plates can be used as well. In this latter case they are not only lighter but more effective as means of checking the splashing of liquid in the cells, providing for good performance of the mass-transfer apparatus at maximum gas (vapour) flow rates.

The mass-transfer apparatus of the invention operates as follows.

Gas or vapour admitted through the pipe 2 passes through the perforated tray 6, contacting there but liquid fed through the sprayer 5.

A layer of froth formed on the tray 6 due to the agitation of the liquid by the gas is of fine cellular structure owing whereto the processes of heat and mass transfer and also of gas scrubbing, go on at a high rate. The scrubbed gas leaves the apparatus through the pipe 3 and the liquid, through the union 4.

Fluctuations in the depth of the liquid on the tray 6 due to non-uniform feeding thereof are offset due to the circulation of the liquid between the cells of the froth retainer 7.

If the trays used are of a large diameter it is practical to provide a free space above the froth retainer to uniformly supply the gas to the above-lying tray. In small-diameter mass-transfer apparatus, the froth retainer can extend through the total distance between two adjacent trays.

The diagonal or cruciform baffle plates provided inside the cells of the froth retainer control the turbulence at the centres of the cells, which gives rise to splashing, and promote the stability of the layer of froth. Perforated baffle plates are particularly effective in this respect, retaining and redistributing the froth in a better way than their solid counterparts. The apparatus with perforated diagonal or cruciform baffle plates in the cells of the froth retainer operate at a maximum gas (vapour) flow rate which cannot be achieved in mass-transfer apparatus featuring froth retainers of any other design.

The disclosed mass-transfer apparatus provides solution to the problem of increasing 1.5 to 2 times the capacity of absorption and desorption plants, fractionation units and gas scrubbing equipment.

Apart from that, the disclosed apparatus improves product purity owing to a high effectiveness of the mechanism of heat and mass transfer therein.

INDUSTRIAL APPLICABILITY

The present invention is conducive to increasing the capacity of the mass-transfer column, which is the key item of a mass-transfer installation, and paves the way to developing compact plants with a large capacity per unit volume. The invention can be used to advantage in the chemical, petrochemical, food, oil and gas industries to cope with mass-transfer processes.

A preferred field of its application comprises deethanizers and stabilizers for processing condensate, high-pressure absorbers for treating natural gas, fractination columns used in the manufacture of synthetic rubber, cryogenic air-separation plants and gas scrubbers.

What is claimed is:

1. A mass-transfer apparatus comprising a case (1) accommodating at least one horizontal perforated tray (6) and a froth retainer (7) mounted directly on the tray (6) and made in the form of a grid composed of vertical bars (8) making up interconnected cells (9), wherein the lower portions of the bars (8) of the froth retainer (7), contiguous with the tray (6), are made solid, and the cells (9) of thh grid communicate with one another through perforations in the upper portions of the bars of the froth retainer (7).

2. A mass-transfer apparatus according to claim 1, wherein the height of the lower solid portion of the bars (8) of the froth retainer (7) is 0.1-0.5 of the height of the bars (8) of the froth retainer (7).

3. A mass-transfer apparatus according to claim 1, wherein the ratio of the total net area of the perforations in the froth retainer (7) and that of the perforations in the tray (6) is 1.2-3.0.

4. A mass-transfer apparatus according to claim 1 wherein if two and more trays are provided in the apparatus, the height B of the froth retainer (7) is 0.6-1.0 of the distance H between the trays.

5. A mass-transfer apparatus according to claim 1 wherein in each cell (9) of the froth retainer (7) at least two diagonal baffle plates (14, 15) are located crosswise one above the other, the height of the baffle plates (14, 15) being at least equal to one half of the length of the side of the cell (9).

6. A mass-transfer apparatus according to claim 5, wherein the baffle plates (12, 13) in the cells (9) are made perforated.

7. A mass-transfer apparatus according to claim 1, wherein at least one cruciform baffle plate (11) is provided in each cell (9) of the froth retainer, the height of said baffle plate being at least equal to one half of the length of the side of the cell (9).

* * * * *